United States Patent [19]

Goto et al.

[11] Patent Number: 5,248,000

[45] Date of Patent: Sep. 28, 1993

[54] HARROWING DEVICE

[75] Inventors: Seizo Goto; Shungo Matsumoto; Shinjiro Kubo, all of Kouchi, Japan

[73] Assignee: Taiyo Tanko Co., Ltd., Japan

[21] Appl. No.: 741,261

[22] Filed: Aug. 7, 1991

[30] Foreign Application Priority Data

Aug. 10, 1990 [JP] Japan .......................... 2-83976[U]

[51] Int. Cl.⁵ ...................... A01B 35/26; A01B 23/02
[52] U.S. Cl. .................................. 172/762; 403/383;
    172/199; 172/735; 172/702; 172/770
[58] Field of Search .............. 172/762, 197, 198, 199,
    172/200, 254, 735, 707, 702, 752, 753, 770, 773;
    403/383, 379

[56] References Cited

U.S. PATENT DOCUMENTS

| | | | |
|---|---|---|---|
| 1,555,160 | 9/1925 | Rossi . | |
| 1,935,416 | 11/1933 | Reynolds . | |
| 1,986,327 | 1/1935 | DeWind et al. | 172/198 |
| 2,997,115 | 8/1961 | Moser | 172/612 |
| 4,361,191 | 11/1982 | Landoll et al. | 172/198 |
| 4,681,307 | 7/1987 | Leonard | 403/383 |
| 4,697,644 | 10/1987 | Doi et al. . | |
| 4,895,368 | 1/1990 | Geiger | 403/383 |
| 5,068,986 | 12/1991 | Jones | 403/379 |
| 5,074,062 | 12/1991 | Hahn et al. | 403/379 |
| 5,117,918 | 6/1992 | Yamada et al. | 172/123 |

FOREIGN PATENT DOCUMENTS

| | | |
|---|---|---|
| 550192 | 8/1981 | Australia . |
| 0196545 | 10/1986 | European Pat. Off. . |
| 0415457 | 3/1991 | European Pat. Off. . |
| 1091612 | 11/1965 | United Kingdom . |

*Primary Examiner*—Dennis L. Taylor
*Assistant Examiner*—Spencer Warnick
*Attorney, Agent, or Firm*—Marger, Johnson, McCollom & Stolowitz

[57] ABSTRACT

A harrowing device for harrowing a ground surface includes a haulable frame. A plurality of blade holders are secured to the frame, and extend downward from the frame. The blade holder has a cavity, a pair of holes, a pair of inclined interior face in the cavity. The inclined interior faces are arranged so as to become close to each other the further away from the holes. A plurality of blades are fitted to the blade holder, each blade having a shank inserted into the cavity and a blade portion for harrowing the ground. The shank has a pair of holes corresponding to the holes of the blade holder, and a protrusion for contacting the inclined interior faces. A pin is inserted into the holes of the blade holder and the shank to pivotably support the blade.

2 Claims, 3 Drawing Sheets

HARROWING DEVICE

BACKGROUND OF THE INVENTION

1. Field of the Invention

This invention relates to a harrowing device for harrowing topsoil of a race track field for horse racing, agricultural land or the like.

2. Description of the Prior Art

Conventionally, harrowing devices have been used for crushing and leveling the topsoil of a race track field for horse racing before starting the race in order to facilitate the racing of horses on the track and to maintain the beauty of the race track.

The conventional harrowing devices are generally provided with a frame, a plurality of blade holders and blades and a hauling member. In the harrowing devices with this configuration, when the devices are hauled on the field using the hauling member, the blades harrow and crush the topsoil of the field to level the ground.

In this harrowing operation, the front edges of the blades are inclined to wear away more than the rear edges of the blades. When the front edge wears away, the efficient of the harrowing operation is reduced. Therefore, to equalize the rate of abrasion of the front edge and the rear edge, when the abrasion advances a little, the blade is reversed so that the front edge and the rear edge are used alternately.

In the turning operation, first a plurality of bolts and nuts which mount the blade to the blade holder are loosened, and then the blades are removed from the blade holders. After that, the blade is reversed so that the front edge becomes the rear edge of the blades, and then the blades are remounted on the blade holders and the bolts and the nuts are tightened.

However, because there are many blades, bolts and nuts, this turning operation is very troublesome. Further, in the case where the cross section of the blade holder has a rhombic shape or a shape of opposing wedges, and the cross section of the shank of the blade for inserting into the blade holder has a rhombic shape or a shape of opposing wedges, the blade cannot be easily removed from the blade holder.

Moreover, in the conventional harrowing devices of the type using bolts and nuts, the bolts and the nuts can become loose, so that the blade will frequently fall away from the blade holder during the harrowing operation. In addition, the blade cannot be easily removed because of rusting of the bolts and the nuts.

SUMMARY OF THE INVENTION

It is an object of the present invention to provide a harrowing device which facilitates removal of the blade from the blade holder to simplify the turning operation or exchanging operation of the blade in a short time.

Another object of the present invention is to provide a harrowing device which can prevent play developing in the blade, or the blade from falling away from the blade holder during the harrowing operation.

These and other objects can be achieved according to the present invention by providing a harrowing device for harrowing a ground surface, comprising:

a haulable frame;

a plurality of blade holders secured to the frame, extending downward from the frame; each blade holder having a cavity, a pair of holes, and a pair of inclined interior faces in the cavity; the inclined interior faces arranged so as to became close to each other the further away from the holes;

a plurality of blades with a shank inserted into the cavity and a blade portion for harrowing the ground; the shank having a pair of holes corresponding to the holes in the blade holder, a protrusion for contacting the inclined interior faces; and a pin inserted into the holes of the blade holder and the shank to pivotably support the blade.

DETAILED DESCRIPTION OF THE PREFERRED EMBODIMENTS

Figure 1:
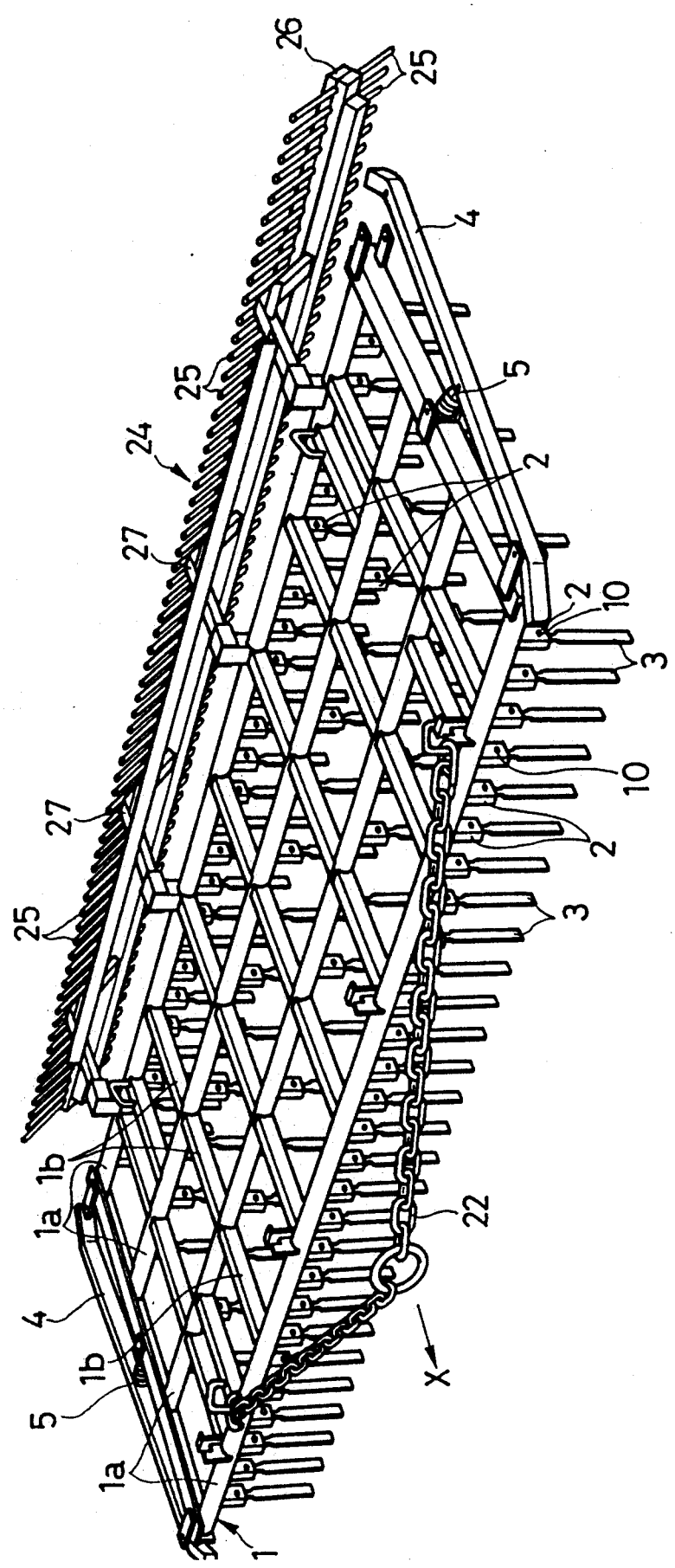
FIG. 1 is a perspective view showing a harrowing device for a race track for horse racing according to the present invention.

Referring to FIG. 1, a harrowing device is provided with a frame 1 having a plurality of blade holders 2. A plurality of blades (harrowing nail) 3 are fitted into the blade holders 2 respectively.

The frame 1 has a plurality of lateral shafts 1a arranged substantially perpendicular to the advancing direction X and a plurality of bars 1b which interconnect the lateral shafts 1b. The bars 1b are arranged substantially parallel to the advancing direction X. The lateral shafts 1a and the bars 1b are preferably made from hollow tube and are interconnected for example by welding. Consequently, the lateral shafts 1a and the bars 1b form the rectangular frame 1. The frame 1 is provided with a pair of dampers 4 on the lateral side of the frame 1, and each damper 4 has a spring 5 for absorbing shock when the frame 1 strikes an object such as a fence.

The blade holders 2 extend downward from the lateral shafts 1a. The blade holders 2 are preferably made through forging as one body, and secured to the lateral shafts 1a, for example, by welding. The blade holders 2 are arranged so as to prevent the blades 3 from overlapping one another in the advancing direction in order to widely and properly harrow the ground.

Figure 2:
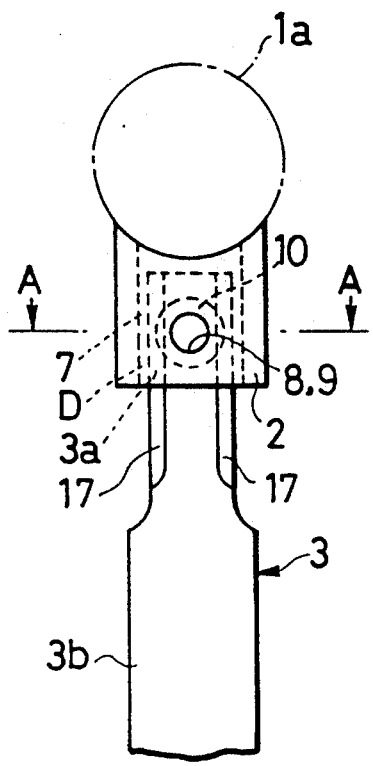
FIG. 2 is an enlarged fragmentary view showing a supporting structure of the blade of the harrowing device shown in FIG. 1.
Figure 3:
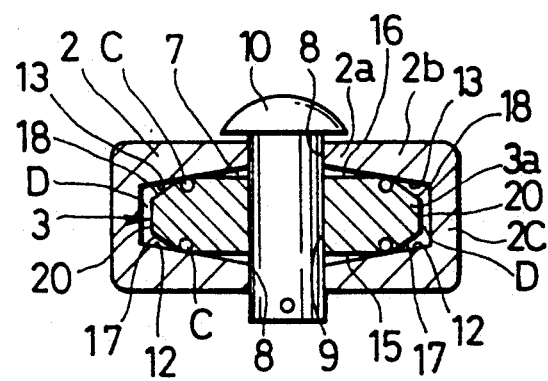
FIG. 3 is a cross sectional view taken along lines A—A in FIG. 2.

As shown in FIGS. 2 and 3, the blade holder 2 is integrally made of one material such as a steel and the cross section of the blade holder 2 has a rectangular external form. The blade holder 2 is provided with a cavity 7 for permitting the insertion of a shank 3a located at one end of the blade 3. Cavity 7 has a cross-sectional shape elongated in a direction parallel to the forward harrowing direction (X) with the depthwise orientation of cavity 7 extending downward allowing vertical insertion of the shank 3a. which has a cross-sectional shape symmetrically elongated in a direction parallel to the forward harrowing direction (X). The blade holder 2 has a transverse hole 8, while the blade 3 has a transverse hole 9 corresponding to the hole 8 of the blade holder 2, and a check pin (lock pin) 10 is removably inserted into the holes 8, 9, so that the blade 3 is pivotably supported by the blade holder 2 through the check pin 10. The check pin 10 is prevented from falling out from the blade holder 2 by a split cotter pin or the like.

The blade 3 is preferably made of steel through forging and consists of the shank 3a held in the blade holder 2 and a blade portion 3b for harrowing the ground. The blade portion 3b is reversible and is provided with a front edge and a rear edge which exchange positions.

The blade holder 2 has a pair of opposing inclined interior faces 12, 13. The blade holder 2 also has a pair of thin wall portions 2a close to the check pin 10 and a pair of thick wall portions 2b away from the check pin 10. The thick wall portions 2b are interconnected through a pair of side walls 2c. The inclined interior faces 12, 13 form a wedge-like pressure holding portion.

The shank 3a has a pair of parallel faces 15, 16, which extend in the right-left direction in FIG. 3. On the right end and the left end of the parallel faces 15, 16, inclined faces 17 and inclined faces 18 are formed respectively at an angle which is more obtuse than that of the inclined interior faces 12, 13. A pair of crossing portions C (protrusions) are formed at the intersection of the parallel faces 15, 16 and the inclined faces 17, 18. When the blade is aligned vertically in the blade holder, a slight gap exists between the crossing portion C and the inclined interior faces 12, 13. The inclined faces 17, 18 are interconnected through a pair of side faces 20, 20. A predetermined space D is produced between the side face 20 and an interior face of the side wall 2c.

In FIG. 1, reference numeral 22 designates a hauling chain as a hauling member. Both ends of the hauling chain 22 are connected to the front lateral shaft 1a of the frame 1. The frame 1 can be hauled through the hauling chain 22 by a tractor, a horse or the like. A wire rope, a connecting shaft or the like may be used instead of the hauling chain 22.

Reference numeral 24 designates a smoothing device. The smoothing device 24 may be provided to further smooth the ground surface. The smoothing device 24 is provided with a plurality of nails 25 for smoothing the ground surface, which nails 25 are arranged in the direction perpendicular to the advancing direction. The nails are held by a nail holder 26 extending parallel to the lateral shaft 1a, which nail holder 26 is secured to the rear lateral shaft 1a through a plurality of retainers 27.

In the harrowing device with this configuration, when the frame 1 is hauled through a hauling chain 22 by a tractor not shown in the figure in the advancing direction X, first the front blades 3 crush the topsoil and the rear blades 3 level the ground. In the case where the smoothing device 24 is additionally provided, the ground leveled by the blade 3 is further smoothed by the nails 25.

In this harrowing operation, the blade 3 slightly pivots on the check pin 10 in the rear direction through a reaction force of the ground, and abuts against the blade holder 2. Then the crossing portions C contact the inclined interior faces 12, 13 and are forced between the inclined interior faces 12, 13. Therefore, The shank 3a of the blade 3 is pressure-held by a reaction force of the thick wall portion 2b of the blade holder 2, so that the blade 3 is firmly fitted to the blade holder 2. In the case where a large pivoting force acts on the blade 3, the side face 20 of the shank 3a contacts the interior face of the side wall 2c to prevent the blade 3 from rotating.

At the same time, the thin and thick wall portions 2a, 2b are resiliently deformed and are opened in a slightly outward direction by the pressing force of the crossing portion C. In particular, the thin wall portions 2a move along the check pin 10 in the axial direction, so that the outer faces of the thin wall portions 2a closely contact the head of the check pin 10 and the split cotter pin respectively to firmly fit the check pin 10 to the blade holder 2. Consequently, the blade 3 can be firmly and securely held by the blade holder 2 without using a means such as bolts and nuts.

In the case where the front edge and the rear edge of the blade 3 are reversed or the blade 3 is exchanged for a new one, the blade 3 is struck by a wooden hammer or the like to cause it to pivot in the advancing direction X. By this operation, the pressure holding state between the blade holder 2 and the blade 3 is easily cancelled. Namely, the pressure holding state is substantially the point contacting state, so that the cancelling operation is easy in comparison with a planer contacting state of a conventional device. Then, by pulling out the check pin 10, the blade 3 can be very easily dislodged from the blade holder 2.

Consequently, the turning operation for the front edge and the rear edge of the blade 3 because of abrasion of the edge becomes easy and simple. Therefore, the edges of the blade 3 wear away evenly to improve the efficiency of the harrowing operation.

Figure 4:
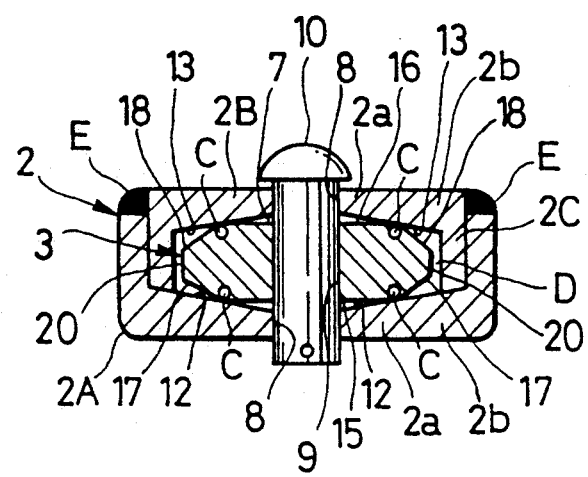
FIG. 4 is a cross sectional view corresponding to FIG. 3 of the second embodiment according to the present invention.

FIG. 4 shows the second embodiment according to the present invention. In FIG. 4, the same reference numbers as that of in FIG. 3 designates members corresponding to that of in FIG. 3. In this embodiment, a blade holder 2 is constituted by channel members 2A and 2B facing each other and welded together at welding portion E. According to this embodiment, manufacture of the blade holder 2 becomes easy.

Figure 5:
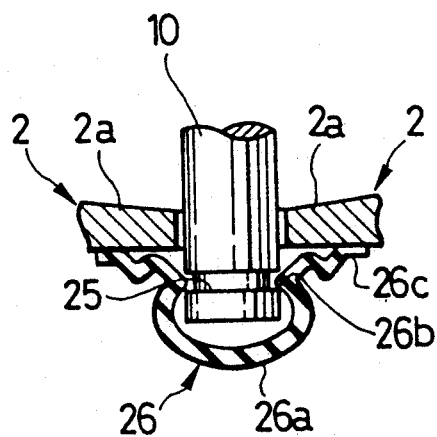
FIG. 5 is a partial sectional view showing a cap fitted to a tip of a check pin of the third embodiment according to the present invention.

FIG. 5 shows the third embodiment according to the present invention. In this embodiment, the tip of the check pin 10 is provided with a groove 25 at a peripheral portion thereof. A cap 26 made of elastic material is provided instead of a split cotter pin. The cap 26 includes a cover portion 26a covering the tip of the check pin 10, an engaging portion 26b engaging the groove 25 of the check pin 10 to prevent the check pin 10 from falling away, and a leg portion 26c contacting the outer surface of the thin wall portion 2a of the blade holder 2. According to this embodiment, fitting and removal of the cap 26 are more easy than that of the split cotter pin.

Figure 6:
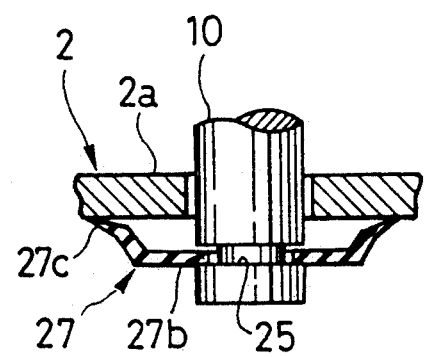
FIG. 6 is a modification of the cap shown in FIG. 5.

FIG. 6 shows a modification of the cap 26. The cap 27 shown in FIG. 6 is provided with a engaging portion 27b engaging the groove 25 of the check pin 10, and a leg portion 27c contacting the outer surface of the thin wall portion 2a. The cap 26, 27 may have other modified shapes.

In addition, the present invention is not limited to the above described embodiments, and may be applied to a harrow for agricultural land or the like.

What is claimed is:

1. A harrowing blade assembly for a frame pulled horizontally above the ground in a forward harrowing direction, the blade assembly comprising:
 a reversible blade (3), having a shank portion (3a) with a cross-sectional shape symmetrically elongated in a direction parallel to the forward harrowing direction (X), a transverse blade hole (9), and a substantially straight vertically extending blade portion (3b) with a cross-sectional shape elongated in a direction parallel with the forward harrowing direction:

the blade portion having parallel vertically extending front and rear blade edges, the front blade edge facing the forward harrowing direction in a forward blade position, and the rear blade edge facing the forward harrowing direction in a reversed blade position;

a blade holder (2) having a pair of coaxial holes (8), formed in parallel opposite sides, and the sides forming a cavity (7) with a cross-sectional shape elongated in the forward harrowing direction with a front and a rear interior surface (12,13);

a pin (10) inserted into the holes (8,9) of the blade holder and the shank to pivotally pressure-support the blade in the blade holder, said pin provided with a groove at a peripheral portion of a tip thereof; and a cap made of elastic material, said cap including a cover portion covering a tip of said pin, an engaging portion engaging said groove of said pin to prevent said pin from falling away, and a leg portion contacting said blade holder, each blade holder being coupled to the frame with a depthwise orientation of the cavity extending vertically downward allowing vertical insertion of the shank portion depthwise into the cavity, each cavity being dimensioned to receive the shank in the forward and reversed blade positions;

the blade (3) during the harrowing operation pivoting about the pin causing the shank to abut the interior surfaces of the cavity;

the blade inserted into the cavity in the forward blade position providing harrowing with the front blade edge and the blade inserted into the cavity in the reversed blade position providing harrowing with the rear blade edge.

2. A harrowing blade assembly for a frame pulled horizontally above the ground in a forward harrowing direction, the blade assembly comprising:

a reversible blade (3), having a shank portion (3a) with a cross-sectional shape symmetrically elongated in a direction parallel to the forward harrowing direction, a transverse blade hole (9), and a substantially straight vertically extending blade portion (3b) with a cross-sectional shape elongated in a direction parallel with the forward harrowing direction:

the blade portion having parallel vertically extending front and rear blade edges, the front blade edge facing the forward harrowing direction in a forward blade position, and the rear blade edge facing the forward harrowing direction in a reversed blade position;

a blade holder (2) having a pair of coaxial holes (8), formed in parallel opposite sides, and the sides forming a cavity (7) with a cross-sectional shape elongated in the forward harrowing direction with a front and a rear interior surface (12,13);

a pin (10) inserted into the holes (8,9) of the blade holder and the shank to pivotally pressure-support the blade in the blade holder, said pin provided with a groove at a peripheral portion of a tip thereof; and a cap made of elastic material, said cap including an engaging portion engaging said groove of said pin, and a leg portion contacting said blade holder;

each blade holder being coupled to the frame with a depthwise orientation of the cavity extending vertically downward allowing vertical insertion of the shank portion depthwise into the cavity, each cavity being dimensioned to receive the shank in the forward and reversed blade positions;

the blade (3) during the harrowing operation pivoting about the pin causing the shank to abut the interior surfaces of the cavity;

the blade inserted into the cavity in the forward blade position providing harrowing with the front blade edge and the blade inserted into the cavity in the reversed blade position providing harrowing with the rear blade edge.

* * * * *